(12) United States Patent
Klinger

(10) Patent No.: US 6,760,591 B1
(45) Date of Patent: Jul. 6, 2004

(54) METHOD AND APPARATUS FOR DETERMINING A POSITION OF A TRANSMITTER IN THREE DIMENSIONS

(75) Inventor: Jürgen Klinger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/577,053

(22) Filed: May 22, 2000

(30) Foreign Application Priority Data

May 21, 1999 (DE) .......................................... 199 23 409

(51) Int. Cl.⁷ ................................................ H04Q 7/20
(52) U.S. Cl. ................................. 455/456.1; 455/422
(58) Field of Search ................................. 455/456, 422, 455/420, 407, 408, 411, 414, 426, 457, 458, 96, 99, 101, 456.2, 404.2; 340/825.49, 825.69, 825.72, 5.61, 5.63, 5.72, 5.64; 342/48, 58, 69, 82, 95, 97, 133, 139, 106–109, 357.01, 357.09

(56) References Cited

U.S. PATENT DOCUMENTS

| | | | |
|---|---|---|---|
| 2,972,742 A | | 2/1961 | Ross |
| 4,717,904 A | * | 1/1988 | Murakami ................. 340/436 |
| 4,760,394 A | | 7/1988 | Takeuchi et al. |
| 5,216,429 A | | 6/1993 | Nakagawa et al. |
| 5,280,457 A | * | 1/1994 | Figueroa et al. ........... 367/127 |
| 5,517,189 A | * | 5/1996 | Bachhuber et al. ........ 340/5.64 |
| 5,600,706 A | * | 2/1997 | Dunn et al. ................. 455/456 |
| 5,602,535 A | * | 2/1997 | Boyles et al. .............. 340/5.22 |
| 5,710,548 A | * | 1/1998 | LeMense ............... 340/825.69 |
| 5,883,598 A | * | 3/1999 | Parl et al. ................... 342/457 |
| 5,982,164 A | * | 11/1999 | Czarnecki et al. ....... 324/76.33 |
| 6,442,391 B1 | * | 8/2002 | Johansson et al. .......... 455/456 |

FOREIGN PATENT DOCUMENTS

| | | |
|---|---|---|
| DE | 1277033 | 9/1968 |
| DE | 2149215 | 4/1978 |
| DE | 3428465 A1 | 2/1986 |
| DE | 35 11 504 C2 | 10/1986 |
| DE | 36 27 193 A1 | 2/1987 |
| DE | 3033990 C2 | 1/1990 |
| DE | 4314216 A1 | 11/1994 |
| DE | 44 09 178 A1 | 9/1995 |
| EP | 0470272 A1 | 2/1992 |

OTHER PUBLICATIONS

Rudolf Grabau: "Funküberwachung und Elektronische Kampfführung", Franckh'sche Verlagshandlung, Stuttgart, Germany, 1986, pp. 5 and 119 ["Radio Monitoring and Electronic Warfare"].

* cited by examiner

Primary Examiner—Nguyen T. Vo
Assistant Examiner—Jean Gelin
(74) Attorney, Agent, or Firm—Laurence A. Greenberg; Werner H. Stemer; Ralph E. Locher

(57) ABSTRACT

In order to determine a position of a transmitter in three dimensions, a signal transmitted by the transmitter is received by four receivers that are separated from one another in three dimensions and are not all disposed on the same plane. In which case the time intervals between a reception of the signal by the four receivers are used to determine the position of the transmitter, taking into account the configuration of the receivers and a propagation speed of the signal in space.

13 Claims, 2 Drawing Sheets

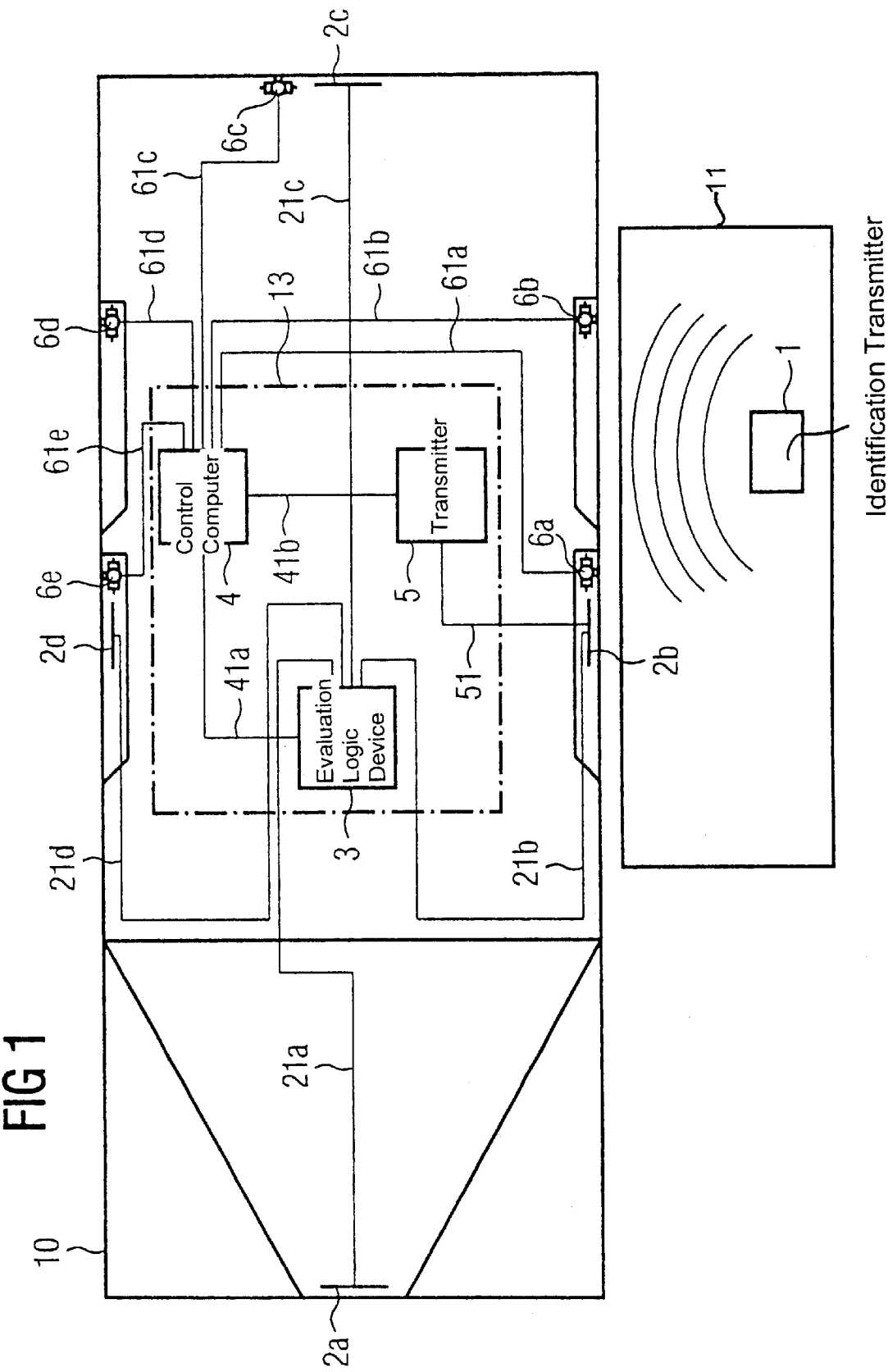

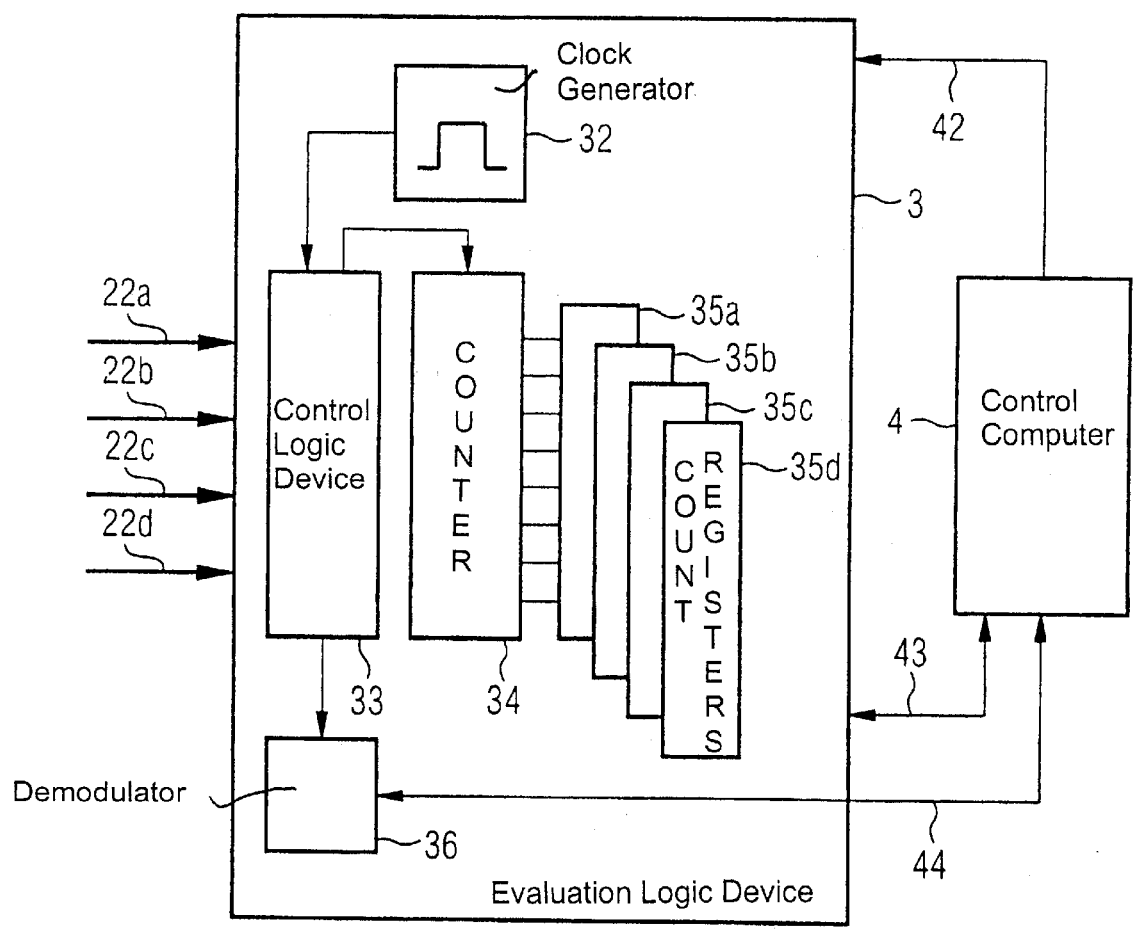

METHOD AND APPARATUS FOR DETERMINING A POSITION OF A TRANSMITTER IN THREE DIMENSIONS

BACKGROUND OF THE INVENTION

FIELD OF THE INVENTION

The invention relates to a method and an apparatus for determining a position of a transmitter in three dimensions. Such position determination is required, for example, for an access and operation authorization system which is referred to by the expression a "hands free" system.

In "hands free" access authorization systems, the access authorization of a person who is requesting access is checked without the person having to carry out any action intended just to initiate the check, that is to say, for example, the insertion of a key in a lock, the pressing of an operating button on a radio transmitter, or the swiping a magnetic strip card through a card reader. "Hands free" access authorization systems generally have an identification unit which checks the access authorization and allows access, and an identification transmitter which identifies those carrying it as being authorized for access. For access authorization monitoring, an identification unit transmits a request signal to the identification transmitter. Reception of the request signal in the identification transmitter triggers a response signal, which is in turn received by the identification unit and is compared with an expected response signal. If they match, the identification unit then allows access by the person carrying the identification transmitter.

In addition to checking the content of the response signal transmitted by the identification transmitter, it is also important in "hands free" access authorization systems to be able to determine, in three dimensions, the position of the identification transmitter which is responding to the request signal from the identification unit. This is done in order to ensure that access authorization is given only when the person carrying the identification transmitter is located in a predetermined three-dimensional area with respect to the identification unit. To this end, in the prior art, the request signal is transmitted by the identification unit such that the identification transmitter can receive it only in this predetermined three-dimensional area. If the identification transmitter then responds to the request signal, then this is assessed by the identification unit as being a sufficient indication that the person carrying the identification transmitter is located in the predetermined three-dimensional area. However, this position determination method requires a complex, and thus expensive, transmitter in the identification unit, in order to ensure that the request signal is transmitted only into the predetermined three-dimensional area. Precise delineation of the desired three-dimensional area is, however, also possible only to a limited extent and with a high level of complexity in terms of transmission technology.

SUMMARY OF THE INVENTION

It is accordingly an object of the invention to provide a method and an apparatus for determining a position of a transmitter in three dimensions that overcome the above-mentioned disadvantages of the prior art methods and devices of this general type, which allows accurate position determination in a simple and reliable manner.

With the foregoing and other objects in view there is provided, in accordance with the invention, a position determining method, which includes:

transmitting a signal via a transmitter;

receiving the signal in four receivers, the receivers disposed separated from one another in three dimensions and not all in a same plane;

determining time intervals between a reception of the signal by each of the four receivers using an evaluation unit;

determining a signal delay time between the four receivers individually and the evaluation unit; and using the evaluation unit for determining a position of the transmitter in three dimensions using the time intervals, a placement of the four receivers, and a propagation speed of the signal in space.

According to the invention, in order to determine the position of a transmitter in three dimensions, the signal :transmitted by the transmitter is received by four receivers which are separated from one another in three dimensions and are not all disposed in the same plane. In which case the time intervals between the reception of the signal by the four receivers is used to determine the position of the transmitter taking into account the positional configuration of the receivers and the propagation speed of the signal in space. High-precision transmitter position determination can thus be carried out according to the invention. Furthermore, the position determination can be carried out using the simple receivers that, according to one preferred embodiment, are antennas. The detection and evaluation of the delay time differences of the signal on reception by the individual receivers furthermore require only evaluation logic constructed from a few components.

According to a preferred embodiment, the signal transmitted by the transmitter for position determination contains a defined intensity change, which is used by an evaluation unit for position determination as a trigger in order to determine the delay time differences between the signals received by the individual receivers. This makes it easier to determine the delay time differences, thus simplifying the technical complexity in the evaluation unit.

When the position-determination technique according to the invention is used in a "hands free" access and operation authorization system, in which the transmitter whose position is intended to be determined corresponds to an identification transmitter, it is furthermore advantageous for the transmitter which is additionally required in the evaluation unit to use one of the receivers to transmit the request signal. If an electromagnetic signal is used for position determination, it is furthermore possible to configure the transmitter and receiver as simple antennas, which can each transmit and receive an isotropic signal.

In accordance with an added feature of the invention, there is the step of transmitting a sound signal as the signal transmitted by the transmitter.

In accordance with an additional feature of the invention, there is the step of determining the position of the transmitter a plurality of times.

In accordance with another feature of the invention, there is the step of decoding and evaluating the signal from at least one of the receivers.

With the foregoing and other objects in view there is further provided, in accordance with the invention, an apparatus for determining a position of a transmitter, including:

four receivers disposed separated from one another in three dimensions and not all in a same plane for receiving a signal transmitted by the transmitter; and an evaluation unit connected to the four receivers for determining time intervals between a reception of the signal by each of the four receivers and for determining a signal delay time between the receivers individually and the evaluation unit, and using the time intervals, a configuration of the receivers, and a propagation speed of the signal in space for determining the position of the transmitter in three dimensions.

In accordance with an added feature of the invention, the evaluation unit has an additional transmitter used to transmit a request signal to the transmitter whose position is intended to be determined, in order to trigger the signal transmitted by the transmitter.

In accordance with an additional feature of the invention, the receivers are antennas, and the additional transmitter for transmitting the request signal uses one of the antennas.

In accordance with a concomitant feature of the invention, the evaluation unit has a first device for decoding the signal received by at least one of the receivers resulting in a decoded signal, and a second device connected to the first device for evaluating a content of the decoded signal.

Other features which are considered as characteristic for the invention are set forth in the appended claims.

Although the invention is illustrated and described herein as embodied in a method and an apparatus for determining a position of a transmitter in three dimensions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of an access and operation authorization system for motor vehicles, in which a position-determination technique is used according to the invention; and FIG. 2 is a block diagram of an evaluation unit for carrying out the position-determination technique.

DESCRIPTION OF THE PREFERRED EMBODIMENTS

A position-determination technique according to the invention will be described in the following text using the example of a "hands free" access and operation authorization monitoring system for a motor vehicle. In all the figures of the drawing, sub-features and integral parts that correspond to one another bear the same reference symbol in each case. Referring now to the figures of the drawing in detail and first, particularly, to FIG. 1 thereof, there is shown a position-determination system disposed in a motor vehicle 10.

The position-determination system essentially contains four receivers 2a, 2b, 2c, 2d that are distributed around the vehicle 10 and are in the form of antennas 2a, 2b, 2c, 2d. The four antennas 2a, 2b, 2c, 2d are in this case disposed in the vehicle 10 so that they are not all on one plane. The antennas 2a, 2b, 2c, 2d are connected to an evaluation logic device 3 via a respective antenna cable 21a, 21b, 21c, 21d. The evaluation logic device 3 is part of an evaluation unit 13, which also includes a control computer 4 and a transmitter 5. The control computer 4 is connected via signal lines 61a, 61b, 61c, 61d, 61e to locking systems 6a, 6b, 6c, 6d, 6e in the vehicle 10. The locking systems 6a, 6b, 6c, 6d each contain a touch-sensitive sensor element, which is preferably fitted in the door handles of the vehicle 10, and an actuator which operates a locking mechanism. The control computer 4 is furthermore connected via a first interface 41a to the evaluation logic device 3, and via a second interface 41b to the transmitter 5. The transmitter 5 is in turn connected via a signal line 51 to one of the antennas, in the present case the vehicle door antenna 2b.

The following access and authorization monitoring method can be carried out using the system shown in FIG. 1. When somebody touches one of the touch-sensitive sensors, which are part of the locking systems 6a, 6b, 6c, 6d of the vehicle 10, the associated locking system sends a signal to the control computer 4, which then switches from a standby mode to a monitoring mode. In the monitoring mode, the control computer 4 activates the transmitter 5 via the interface 42, and the transmitter 5 then transmits a request signal via the door antenna 2b. The door antenna 2b in this case preferably emits an isotropic electromagnetic signal, at a frequency and a field strength predetermined by the transmitter 5. The request signal is in turn received by an identification transmitter 1, which the person who wishes to gain access to the vehicle carries with him. In order to receive the request signal, the identification transmitter 1 preferably has an antenna that essentially corresponds to the antennas provided in the vehicle 10. The received request signal from the transmitter 5 then triggers a transmission process in the identification transmitter 1, in which process the identification transmitter 1 emits a response signal. The response signal preferably contains modulated information and a defined change in field strength. Since the identification transmitter 1 is intended to be as small and simple as possible, the receiving antenna for the request signal from the transmitter may at the same time be used as a transmitting antenna for the response signal.

The electromagnetic response signal, which is preferably transmitted isotropically by the identification transmitter 1, is received by the four antenna 2a, 2b, 2c, 2d in the vehicle 10, which are disposed separated in three dimensions and not on a same plane, with the individual antennas receiving the response signal at different times owing to the different distances from the identification transmitter 1. The antennas 2a, 2b, 2c, 2d pass the received response signal via respective antenna lines 21a, 21b, 21c, 21d to the evaluation logic device 3. The time intervals between the arrival of the response signals received via the individual antenna lines 2a, 2b, 2c, 2d are measured in the evaluation logic device 3. A field strength change that is imposed in the response signal from the identification transmitter 1 is in this case preferably used as a trigger to measure the delay time difference. The time intervals, which are stored in the evaluation logic device 3, between the arrival of the response signals received from the individual antenna lines 2a, 2b, 2c, 2d are interrogated by the control computer 4 via the interface 41a.

The control computer 4 then uses these times to determine six resultant delay time differences in the reception of the response signal by the four antennas 2a, 2b, 2c, 2d, owing to the different distances to the identification transmitter 1. When determining the six delay time differences for the four antennas 2a, 2b, 2c, 2d, the control computer 4 takes account of the signal transmission times in the individual antenna lines 21a, 21b, 21c, 21d. The control computer 4 then uses the six delay time differences and a known propagation speed of the electromagnetic response signal in space to derive the range differences between the identification transmitter 1 and the individual antennas 2a, 2b, 2c, 2d. The control computer 4 uses these range differences, also taking account of the position data of the individual antennas 2a, 2b, 2c, 2d in the vehicle 10, to calculate the position of the identification transmitter 1 in three dimensions using the following equations:

$$\frac{(x-x_{2a})^2-(x-x_{2b})^2+(y-y_{2a})^2-(y-y_{2b})^2+(z-z_{2a})^2-(z-z_{2b})^2}{d_{2a2b}} = \frac{(x-x_{2a})^2-(x-x_{2c})^2+(y-y_{2a})^2-(y-y_{2c})^2+(z-z_{2a})^2-(z-z_{2c})^2}{d_{2a2c}} \quad (1)$$

$$\frac{(x-x_{2d})^2-(x-x_{2a})^2+(y-y_{2d})^2-(y-y_{2a})^2+(z-z_{2d})^2-(z-z_{2a})^2}{d_{2d2a}} = \frac{(x-x_{2d})^2-(x-x_{2c})^2+(y-y_{2d})^2-(y-y_{2c})^2+(z-z_{2d})^2-(z-z_{2c})^2}{d_{2d2c}} \quad (2)$$

$$\frac{(x-x_{2b})^2-(x-x_{2d})^2+(y-y_{2b})^2-(y-y_{2a})^2+(z-z_{2b})^2-(z-z_{2d})^2}{d_{2b2d}} = \frac{(x-x_{2b})^2-(x-x_{2c})^2+(y-y_{2b})^2-(y-y_{2c})^2+(z-z_{2b})^2-(z-z_{2c})^2}{d_{2b2c}} \quad (3)$$

in which case, related to a predetermined coordinate system whose coordinate origin may be defined as required, for example at the position of the control computer 4 or else of one of the antennas in the vehicle 10, x, y, z represent the position of the identification transmitter 1 and $x_m$, $y_m$, $z_m$ represent the positions of the individual antennas 2a, 2b, 2c, 2d, and in which case $d_{nm}$ corresponds to the range differences between the respective antennas 2a, 2b, 2c, 2d and the identification transmitter 1, which are calculated by the control computer 4 from the different times at which the response signal is received by the individual antennas.

The illustrated position-determination technique according to the invention allows high-precision position resolution of the transmitter position, and thus of the identification transmitter 1. Thus, in an area close to the vehicle, position determination with an accuracy of less than 15 cm is possible, even with a low level of technical complexity, for access and operation authorization monitoring systems for vehicles. The area close to the vehicle in this case should be regarded as a radius of twice the vehicle length, if the four antennas are fitted to the front and rear and in the door area of the vehicle. The transmission power of the identification transmitter is generally too weak, and the angular differences between the individual antennas with respect to the identification transmitter are generally too small, to determine positions at a greater distance from the vehicle.

At the same time as the described position determination according to the invention by the evaluation unit 13, the response signal can also be demodulated by the evaluation logic device 3 and then compared by the control computer 4 with an expected response signal, in order to carry out an identification and thus authorization monitoring of the identification transmitter 1. In order to preclude interference influences, the response signals received by all the antennas are preferably checked in this case. Furthermore, for security reasons, it is also advantageous to check a plurality of successive response signals from the identification transmitter 1 for position determination and for identification.

If the control computer 4 has detected that the received response signal matches the expected response signal and the identification transmitter 1 is still located in a permissible area relative to the vehicle 10, for example in the area 11 which is shown in FIG. 1 and which indicates the permissible area for opening the vehicle door, the control computer 4 actuates the vehicle door locking system 6b via the corresponding signal line 61b, as a result of which the associated locking mechanism is operated, and the vehicle is unlocked. The person carrying the identification transmitter 1 can then open the driver door, and enter the vehicle.

In addition to the described checking of the access authorization to the vehicle, the system shown in FIG. 1 may also be used to check the operation authorization for the vehicle. For example, the system may use the position-determination technique according to the invention to determine whether the identification transmitter 1 is located in the vehicle 10, and to emit a response signal that authorizes starting of the vehicle only in this situation will the control computer 4 then allow the vehicle to be started by the person carrying the identification transmitter Instead of using electromagnetic signals, the position-determination process according to the invention may also be carried out by transmitting sound waves, for example in the ultrasound band. However, since the propagation speed of sound is in this case dependent on external factors, such as the air pressure and air humidity, positions can be determined only with limited accuracy. Such limited position resolution is, however, generally sufficient if the position-determination system is intended to be used, for example, to open a building door completely automatically.

FIG. 2 shows one possible configuration of the evaluation logic device 3 by which the position-determination method according to the invention can be carried out. The control computer 4, preferably a microprocessor, triggers a position measurement by switching a control logic device 33 and a counter 34 in the evaluation logic 3 to a defined initial state, via a control line 42 contained in the interface 41a. When a defined field strength signal is then received via one of antenna inputs 22a, 22b, 22c, 22d connected to the antenna lines 21a, 21b, 21c, 21d, then the control logic device 33 passes a clock (produced by a clock generator 32) on to the counter 34, while at the same time defining the present count as an initial state in a count register 35a, 35b, 35c, 35d associated with the corresponding antenna input. If the defined field strength signal is now likewise received at another antenna input, this triggers the transmission of the present count in the counter 34 to the count register associated with this antenna input. If all four count registers 35a, 35b, 35c, 35d are filled with a count value or the counter 34 is overflowing, the count values are signaled to the control computer 4 via an interface line 43 contained in the interface 41a between the evaluation logic device 3 and the control computer 4. The control computer 4 then reads the respective count registers 35a, 35b, 35c, 35d via the interface line 42 and, after using the known signal delay times for the respective antenna lines 21a, 21b, 21c, 21d to correct the count values, uses the method described above to calculate the point of origin of the signal, and thus the position of the associated transmitter.

In parallel with the position determination, the control computer 4 can also evaluate the content of the signals received via the antenna inputs 22a, 22b, 22c, 22d. The control logic device 33 for this purposes passes the received signal to a demodulator 36 in the evaluation logic device 3 which, after demodulation of this signal, passes the signal to the control computer 4 via further interfaces 44 which are contained in the interface 41a with the evaluation logic device 3. The control computer 4 then compares the demodulated signal with a previously calculated response signal in order, if appropriate, to determine that the contents match.

As an alternative to the configuration of the evaluation logic device 3 shown in FIG. 2, it is also possible to use separate counters instead of one counter 34 with four count registers 35a, 35b, 35c, 35d, and the separate counters are then associated with the respective antenna inputs 22a, 22b, 22c, 22d. Furthermore, it is also possible to use analog signal evaluation instead of digital signal evaluation. To do this, instead of a counter, the first signal arriving via the antenna inputs starts four current sources, which each charge an associated capacitor. However, the charging of the capacitor which is associated with the antenna input via which the first signal has arrived is immediately stopped again. The other signals arriving via the other antenna inputs then stop the charging of the respectively associated capacitor with a corresponding time delay. The control computer 4 can then read the voltages on the capacitors via A/D converters, and can use these voltages to calculate the delay time differences in signal reception.

I claim:

1. A position determining method, which comprises:
   transmitting a signal via a transmitter;
   receiving the signal in four receivers of an access and authorization control system, the receivers disposed separated from one another in three dimensions and not all in the same plane;
   determining time intervals between a reception of the signal by each of the four receivers using an evaluation unit;
   determining a signal delay time between the four receivers individually and the evaluation unit;
   using the evaluation unit for determining a position of the transmitter in three dimensions using the time intervals, a placement of the four receivers, and a propagation speed of the signal in space; and
   using the position of the transmitter in the access and authorization control system to access and authorize.

2. The method according to claim 1, which comprises providing the signal transmitted by the transmitter with at least one intensity change, and using the intensity change in the evaluation unit as a trigger in order to determine the time intervals between the reception of the signal by each the receivers.

3. The method according to claim 1, which comprises emitting from the evaluation unit a request signal to the transmitter whose position is intended to be determined, in order to initiate the signal used for position determination.

4. The method according to claim 1, which comprises transmitting the signal electromagnetically.

5. The method according to claim 1, which comprises transmitting a sound signal as the signal transmitted by the transmitter.

6. The method according to claim 1, which comprises determining the position of the transmitter a plurality of times.

7. The method according to claim 1, which comprises decoding and evaluating the signal from at least one of the receivers.

8. In an access and authorization control system, an apparatus for determining a position of a transmitter, comprising:
   four receivers disposed separated from one another in three dimensions and not all in the same plane for receiving a signal transmitted by the transmitter; and
   an evaluation unit connected to said four receivers for determining time intervals between a reception of the signal by each of said four receivers and for determining a signal delay time between said receivers individually and said evaluation unit, and using the time intervals, a configuration of said receivers, and a propagation speed of the signal in space for determining the position of the transmitter in three dimensions, and using the position of the transmitter in the access and authorization control system to access and authorize.

9. The apparatus according to claim 8, wherein said evaluation unit has an additional transmitter used to transmit a request signal to the transmitter whose position is intended to be determined, in order to trigger the signal transmitted by the transmitter.

10. The apparatus according to claim 9, wherein said receivers are antennas, and said additional transmitter for transmitting the request signal uses one of said antennas.

11. The apparatus according to claim 8, wherein said evaluation unit has a first device for decoding the signal received by at least one of said receivers resulting in a decoded signal, and a second device connected to said first device for evaluating a content of the decoded signal.

12. A position determining method, which comprises:
   emitting a request signal from an evaluation unit to a transmitter having a position intended to be determined, for initiating a transmission of a further signal via a transmitter;
   receiving the further signal in four receivers, the receivers disposed separated from one another in three dimensions and not all in the same plane;
   determining time intervals between a reception of the further signal by each of the four receivers using the evaluation unit;
   determining a signal delay time between the four receivers individually and the evaluation unit; and
   using the evaluation unit for determining a position of the transmitter in three dimensions using the time intervals, a placement of the four receivers, and a propagation speed of the signal in space.

13. The method according to claim 1, which further comprises providing bi-directional dialog between the transmitter and the receivers.

* * * * *